Sept. 16, 1969  P. D. ZIEGENHAGEN ET AL  3,466,925
METHOD AND APPARATUS FOR MEASURING POROSITY
Filed Aug. 9, 1967  3 Sheets-Sheet 1

Inventors:
Paul D. Ziegenhagen
Harold R. Fretz
Arthur C. Langlois
Wayne A. Damrau
By
Gary, Parker, Juettner & Cullinan
Attys

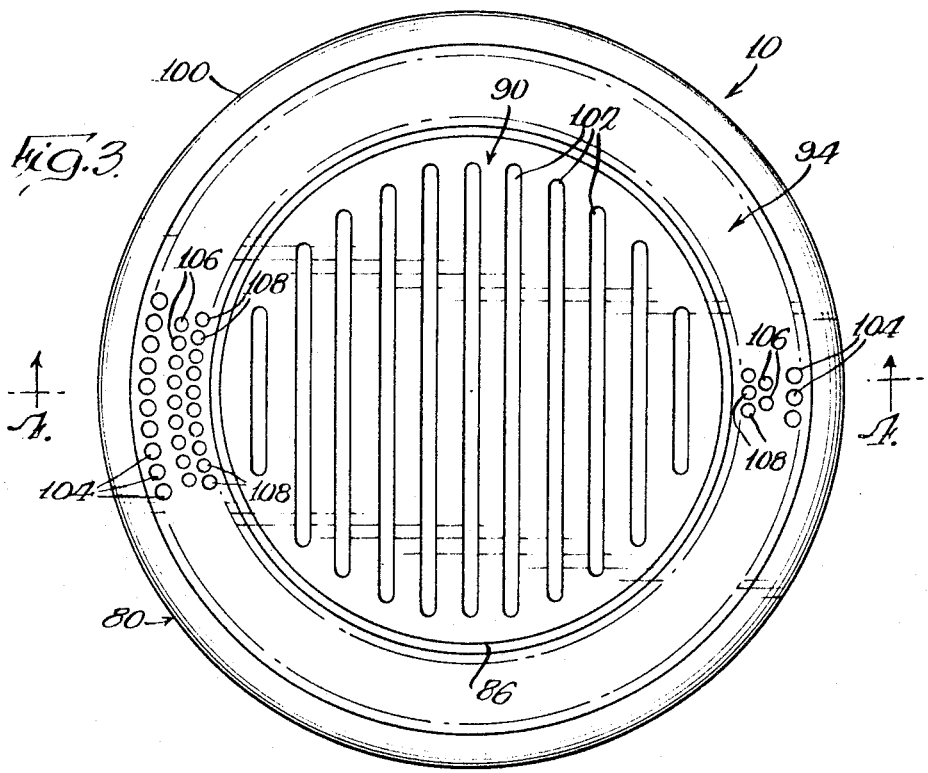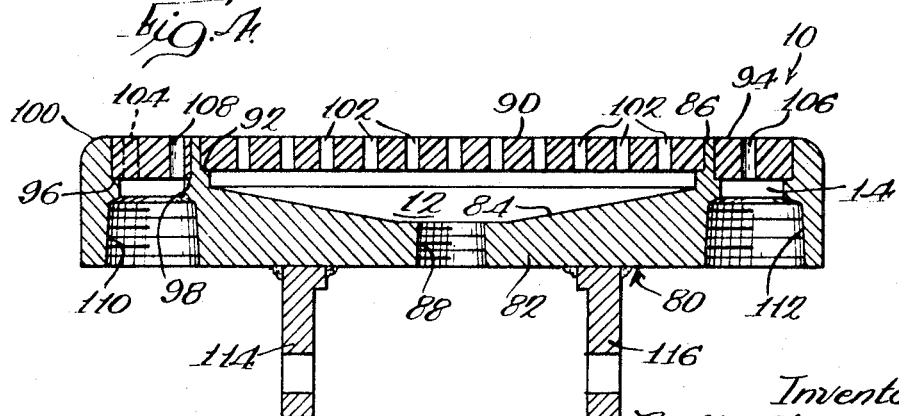

United States Patent Office                                    3,466,925
                                                         Patented Sept. 16, 1969

3,466,925
METHOD AND APPARATUS FOR
MEASURING POROSITY
Paul D. Ziegenhagen, Harold R. Fretz, Arthur C.
Langlois, and Wayne A. Damrau, Wisconsin
Rapids, Wis., assignors to Consolidated Papers,
Inc., Wisconsin Rapids, Wis., a corporation of
Wisconsin
Filed Aug. 9, 1967, Ser. No. 659,395
Int. Cl. G01m 3/02
U.S. Cl. 73—38                                    20 Claims

ABSTRACT OF THE DISCLOSURE

Method and apparatus for measuring the porosity of a moving web of material such as paper or the like by positioning a measuring head in contact with the moving web, applying a vacuum to the measuring head so as to draw air through the paper and into the measuring head in such a manner that the air flow through the head and the vacuum pressure within the head will vary in accordance with the porosity or air permeability of the web, and continuously measuring variations in the vacuum pressure within the head or in a conduit connected thereto as a continuous indication of the porosity or air permeability of the web passing across the head.

BRIEF SUMMARY OF THE INVENTION

Blistering is a major problem which is often encountered in the printing of paper, and such problem is believed to be caused by expansion of vapors within the web. In other words, when the web is printed and is thereafter passed through a drying oven, the expansion of the vapors within the web will produce blistering of the web unless such vapors can escape through the pores in the web. Accordingly, blistering is related to the porosity or air permeability of the paper, and it has been found that blistering can be reduced by controlling the base sheet porosity of the paper web within certain limits found to be acceptable. Thus, porosity targets may be determined for various grades of paper, and through experience we have found that if the papermaker can come reasonably close to such targets, blistering due to porosity of the paper will be reduced to a minimum. Such control over base sheet porosity is particularly important where the paper is used for web offset printing, because with this type of printing large solid areas of ink coverage tend to block the pores of the sheet and therefore increase the tendency of the paper toward blistering.

Heretofore, the most common method of measuring the porosity of paper has been to obtain a sample of the base sheet at the breaker stack and conduct a conventional laboratory porosity test on the sample. The results of such laboratory tests are then used to control the degree of pulp refining. Certain attempts have also been made to conduct continuous-on-the-machine porosity measurements, but various problems heretofore encountered have prevented extensive use of such a technique. One serious problem has been due to a failure to develop techniques and apparatus which are sufficiently sensitive and responsive to measure accurately changes in porosity of a paper web as the web travels over a measuring head or the like at a very high speed. Another related difficulty has been due to a failure to produce a measuring device which provides the required sensitivity and yet is relatively small and lightweight so that it can readily be moved back and forth across a moving web in order to traverse the same. In addition, the apparatus developed heretofore for making on-the-machine porosity measurements has been relatively expensive and complex and has also been subject to significant limitations with respect to the speed at which the paper web may be moved across the measuring head without impairing the accuracy of the porosity measurements of the web.

Another difficult problem which has been encountered in attempts to make on-the-machine porosity measurements of a moving paper web has been due to the need for providing a measuring head which is in continuous contact with the moving web and which has a vacuum source connected thereto for drawing air through the web and into the measuring head. Such apparatus commonly has a tendency to distort the web as it passes over the head, i.e., partially draw the web into openings in the head thereby producing wrinkles or creases in the web. Moreover, because of the continuous contact between the measuring head and the rapidly moving web, with a vacuum source being connected to the measuring head, extensive problems have previously been encountered due to collection of dust particles and other foreign matter at the surface of the measuring head and within the measuring apparatus.

It is therefore a general object of the present invention to provide an improved method and apparatus for making on-the-machine porosity measurements of a moving web of paper or the like which eliminate or substantially minimize the various problems discussed hereinabove.

Another object of the invention is to provide apparatus for making on-the-machine porosity measurements which is sufficiently sensitive that it can function properly with a measuring head of relatively small size which if desired can readily be made to traverse a moving web.

An additional object of the invention is to provide apparatus of the foregoing type which is relatively inexpensive to manufacture, relatively simple to install and operate, and which requires a minimum of maintenance.

A still further one of our objects is to provide apparatus as above-mentioned which will produce accurate on-the-machine porosity measurements even when the web is moving at exceptionally high speeds.

Still another object of the invention is to provide apparatus for making on-the-machine porosity measurements including a porosity measuring head which is designed to minimize collection of dust particles and the like from the paper web which moves in contact therewith.

It is also an object of the present invention to provide apparatus as last above-mentioned including a porosity measuring vacuum head which is capable of continuous engagement with a web of paper moving at high speed without inducing wrinkles or creases in the web or otherwise distorting or damaging the same.

The foregoing and other objects and advantages of the invention will be apparent from the following description thereof.

Now, in order to acquaint those skilled in the art with the manner of making and using our invention, we shall describe, in conjunction with the accompanying drawings, certain preferred embodiments of the invention.

DESCRIPTION OF THE DRAWINGS

FIGURE 1 is a somewhat schematic elevational view, partly in section, showing apparatus constructed in accordance with the present invention for making on-the-machine porosity measurements on a moving web of paper or the like;

FIGURE 3 is an enlarged top plan view of a porosity measuring head comprising one component of the porosity measuring system of FIGURE 1, there being shown a plurality of openings in the head for receiving air which is drawn through a web moving thereacross;

FIGURE 4 is a vertical section taken substantially along the line 4—4 of FIGURE 3;

DETAILED DESCRIPTION OF THE INVENTION

Figure 1:
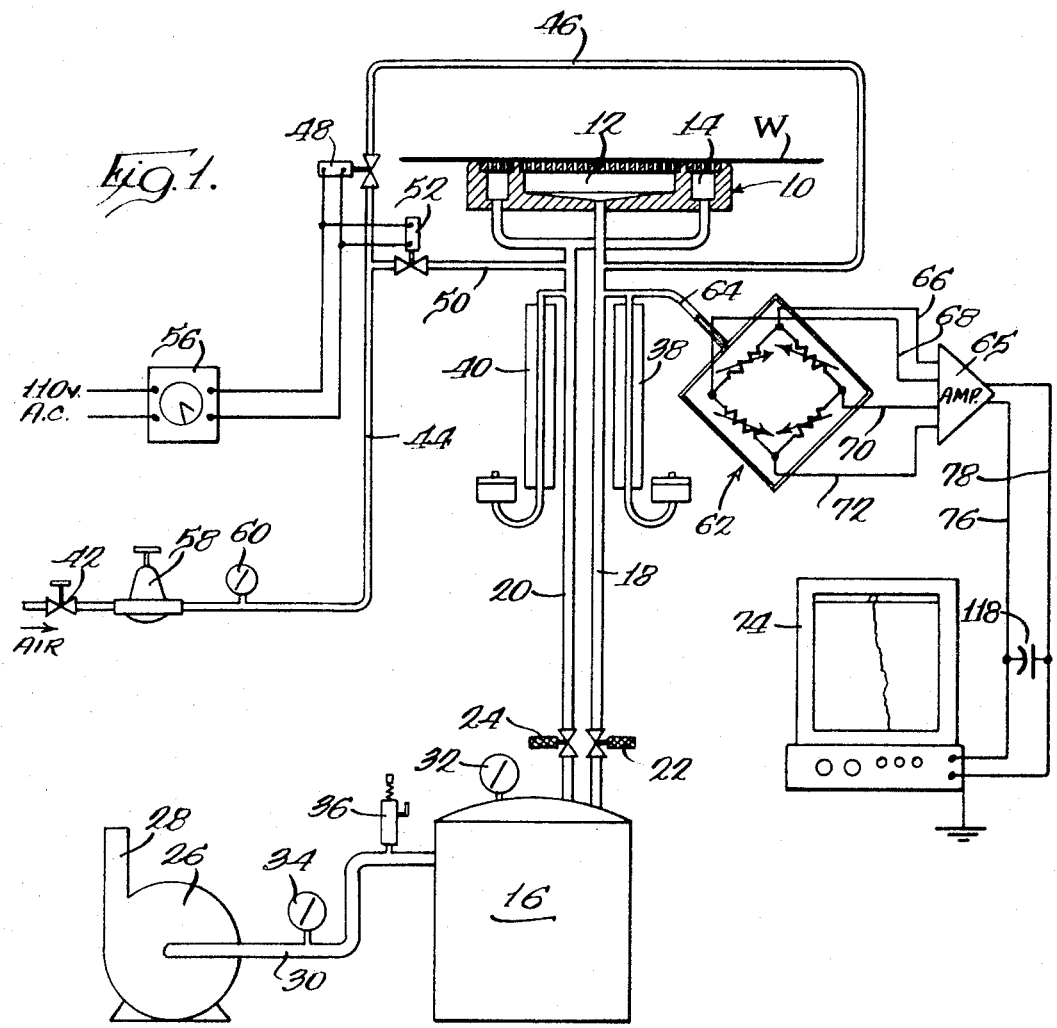

Referring now to the drawings, FIGURE 1 shows a porosity head member 10 having a central measuring section 12, and an annular sealing section 14 which surrounds the measuring section for a purpose to be described later herein. A vacuum tank 16 is provided, and a measuring line or air conduit 18 is connected between the porosity head measuring section 12 and the vacuum tank. In addition, a second line 20, referred to herein as a sealing line, is connected between the porosity head sealing section 14 and the vacuum tank 16. A pair of micrometer needle valves 22 and 24 are located in the lines 18 and 20, respectively, to permit adjustment of the vacuum pressures in such lines. A vacuum pump 26 having an exhaust 28 is connected to the tank 16 by means of a conduit 30. A pair of vacuum gages 32 and 34 are mounted on the tank 16 and on the conduit 30, respectively, and a vacuum regulator 36 is also provided on the conduit 30.

A pair of manometers 38 and 40 are connected to the measuring line 18 and sealing line 20, respectively, the two points of connection preferably being at approximately equal distances from the measuring head 10. In addition, a source of air at a pressure of approximately 80 to 100 p.s.i.g. is indicated at 42, and the air source 42 is connected to the central measuring section 12 of the porisity head 10 by means of air lines 44, 46, the latter conduit having a normally closed solenoid valve 48 provided therein. An air line 50 is connected between the conduit 44 and the annular sealing section 14 of the porosity head, and the air line 50 has a normally closed solenoid valve 52 disposed therein. The valves 48 and 52 are opened at predetermined timed intervals by a timer 56 in order to provide a blast of air at the measuring section 12 and sealing section 14 to effect cleaning thereof. A pressure regulator 58 and pressure gage 60 are provided in the air line 44 to reduce the source pressure as required.

In accordance with the method of the present invention, which will be described more fully hereinafter, apparatus is provided for measuring vacuum pressure variations in the porosity head measuring line 18. For this purpose, there is provided a temperature compensated pressure transducer 62 of a type which is manufactured by Statham Instruments, Inc. The pressure transducer 62 is connected to the measuring line 18 by means of a conduit 64, and preferably the connection is made relatively close to the porosity head 10 so as to avoid any effect due to pressure drop along the length of the line 18. It will also be noted that in the embodiment being described the manometer 38 is connected to the measuring line 18 by being tapped to the conduit 64, and thus the vacuum pressure indicated by the manometer 38 will correspond to the vacuum pressure being sensed by the pressure transducer 62.

The quantity of air flowing into the measuring section 12 of the porosity head 10 is determined by the porosity or air permeability of the web W, and as airflow into the head 10 changes, the vacuum pressure level in the head will also change. The pressure transducer 62 is sensitive to vacuum pressure level change in the head and produces an electrical signal which varies in proportion to changes in the vacuum pressure sensed within the measuring line 18. The transducer 62 is connected to a bridge amplifier 65 by means of electrical leads 66, 68, 70 and 72, and the amplifier 65 is connected to a conventional Sargent recorder 74 by means of leads 76 and 78. In this manner, the recorder will in effect provide a continuous plot or chart indicating the magnitude of and variations in the vacuum pressure within the measuring line 18 at the point of connection with the conduit 64. In addition, the bridge amplifier 65 is preferably calibrated to provide a direct reading of the vacuum pressure being sensed by the transducer 62. As will be explained more fully hereinafter, the measurements of vacuum pressures recorded by the chart recorder 74 will provide accurate indications of the porosity of a web of paper or the like W which is continuously moved over the surface of the porosity head 10 and thereby subjected to the vacuum pressure provided within the head. It will further be understood that the manometer 38 is located right at the transducer tap so as to provide a direct reading of the pressure being recorded on the chart recorder 74. The manometer 38 thus serves as an aid in checking the accuracy of the vacuum pressure measuring system. The manometer 40 is used to check the vacuum pressure at the sealing section 14 of the measuring head 10.

Reference is now made to FIGURES 3 and 4 which show the porosity head member 10 in greater detail. The porosity head 10 comprises a body portion 80 including a central body section 82 having a dish-shaped or recessed upper surface 84 which is surrounded by a solid annular rim or ring-shaped wall portion 86. A threaded opening 88 is formed in the center of the central body section 82 in order to permit connection with the central measuring line or air conduit 18. The central portion of the porosity head 10 within the annular rim 86 has been referred to earlier herein as the central measuring section 12, and the portion of the porosity head disposed radially outwardly of the annular rim 86 has been referred to as the sealing section 14. It will now be understood that the central measuring section 12 and the outer sealing section 14 are separated by the solid annular rim 86.

A central circular insert plate 90 is mounted within the annular rim 86 so as to fit against an annular shoulder 92, and an outer annular insert plate 94 is mounted outwardly of the annular rim 86 so as to fit against a pair of annular shoulders 96 and 98. The body portion 80 includes an outer rim 100, and it will be seen that the insert plate 94 is annular in its configuration and fits between the inner and outer rims 86 and 100. The center insert plate 90 is circular in its configuration and together with the outer insert plate 94 defines a generally coplanar surface over which the continuous web W of paper or the like is adapted to pass. As will be understood more fully hereinafter, the vacuum pressure produced within the measuring head 10 will hold the web W in continuous contact with the plates 90 and 94 as the web moves thereover at a relatively high speed, e.g., up to 3000 feet per minute or more.

In the particular embodiment being described, the central insert plate 90 is formed with eleven equally spaced parallel slots 102 each approximately ⅛ inch in width. The slots 102 are greater in length at the center of the insert, and the outer slots become increasingly shorter in keeping with the circular shape of the insert plate. The precise number of the slots 102 and the precise width thereof are not critical and may be varied somewhat to suit particular applications, but it is an important feature of the invention that such slots be oriented in the machine direction, i.e., parallel to the direction of travel of the moving paper web W. Moreover, it is significant to note the approximate size of the porosity head 10 and the center insert plate 90, since such dimensions are related to the sensitivity afforded by the method of the present invention and are also relevant with respect to the feasibility of traversing the web W with the porosity head, as will be discussed more fully later herein.

In accordance with the present invention, the outer diameter of the porosity head 10 need not exceed more than approximately six or seven inches for most applications, in which case the diameter of the center insert plate need not exceed approximately four or five inches. For many applications it is possible to reduce the size of the porosity head to less than the foregoing so as to provide a porosity head which can easily be made to traverse a moving paper web.

The purpose of the outer sealing section 14 of the porosity head 10 is to assure that air will not flow under the moving web W between the web and the top surface of the porosity head and then pass into the measuring section 12. Such leakage of air into the measuring section 12 will impair the accuracy of the porosity measurements, since in order to obtain accurate measurements it is important that only air passing directly through the paper web W be permitted enter the measuring section 12 of the porosity head. It will be understood that by virtue of the sealing section 14, any air which leaks under the web W between the web and the porosity head without passing through the web will be drawn through the outer insert plate 94 and into the sealing line 20 so as not to affect the vacuum pressures being sensed by the pressure transducer 62.

In the particular embodiment shown in FIGURES 3 and 4, the outer insert plate 94 is provided with a plurality of small round holes arranged in three concentric rings, there being provided an outer ring of holes 104, an intermediate ring of holes 106, and an inner ring of holes 108. The holes in each of the three rings are equally spaced, and preferably the holes in each ring are staggered with respect to the holes in the other rings to minimize the possibility of air passing across the insert plate 94 without being drawn down through one of the holes therein. The center insert plate 90 and the outer annular insert plate 94 are both removable from the body portion 80 in the event it should be desired to replace such plates due to wear or damage. The outer diameter of the center insert plate 90 may be dimensioned to provide a press fit within the annular rim 86, and the outer diameter of the outer insert plate 94 may be dimensioned to provide a press fit within the outer annular rim 100. It is desirable to maintain the open area in the center insert plate 90 approximately equal to the open area in the outer insert plate 94 so as to minimize the possibility of there being lateral flow of air under or through the web W from one of the sections 12 and 14 to the other.

It is important that the insert plates 90 and 94 be designed so as to minimize any damage to the web W which passes thereover and also to minimize collection of dust particles or the like from the web. In this regard, it should first be understood that because of the sensitivity of the apparatus of the present invention, it is possible to provide a relatively small porosity head member 10 having relatively small openings therein, and for this reason it is possible to make the openings in the center insert plate 90 sufficiently small as to avoid the danger of having the vacuum pull the web W down into such openings or otherwise distort the web. In addition, in order to afford a predetermined open area in the center insert plate 90, it has been found preferable to provide a relatively large number of small openings separated from one another by land area, rather than a small number of openings of much larger dimensions, since an arrangement of the latter type is more susceptible to drawing the web W partially down into the openings thereby causing wrinkles or creases or other distortion of the web.

Accordingly, where the center insert plate 90 has an outer diameter in the approximate range of two inches to six inches, it has been found desirable to provide at least approximately seven and preferably nine or more equally spaced parallel slots therein, such as shown for example in the embodiment of FIGURE 3 where eleven parallel slots are provided in the plate 90 which is approximately four inches or less in diameter. It is important to note that by providing a relatively large number of narrow slots, each preferably not substantially exceeding one-eighth inch in width, it is possible to arrange the slots parallel to the machine direction, i.e., parallel to the direction of travel of the moving web W. On the other hand, if a small number of wide slots are utilized, it may become necessary to arrange the slots transverse to the direction of travel of the web W in order to avoid having the web damaged by being partially drawn into the slots as it passes thereover.

It should be borne in mind, as mentioned hereinabove, that a related problem concerns collection of dust particles from the web by the insert plate 90, and we have found that the latter problem is greatly reduced by arranging the slots 102 so that they run parallel to the machine direction or direction of travel of the web W. As for the outer insert plate 94, the embodiment shown in FIGURES 3 and 4 having a large number of small round holes formed therein has been found extremely effective in performing the intended sealing function while at the same time avoiding damage to the web W and minimizing any collection of dust particles or the like at the porosity head 10. By staggering the three rings of holes 104, 106 and 108 it becomes highly unlikely that any appreciable amount of air will pass across the plate 94 without being drawn down through the holes by the vacuum applied to the sealing section 14, and the land area afforded by such an arrangement is highly effective in preventing wrinkles or creases from being formed on the web W. It has also been found that such an arrangement has very little tendency to pick dust particles or the like from the web W as it moves thereover.

FIGURE 4 shows a pair of threaded holes 110 and 112 which are formed in opposite sides of the porosity head body portion 80 and which permit connection of the sealing line 20 to the sealing section 14 of the porosity head. The operation of the porosity measuring apparatus of the present invention will be described more fully later herein, but it will now be understood that the vacuum tank 16 comprises a common vacuum source which is applied both to the measuring section 12 and the sealing section 14 of the porosity head 10, and as a continuous web of paper W passes over the head so as to be drawn in contact therewith, any air which is drawn directly through the portion of the web above the insert plate 90 will be drawn through the slots 102 into the measuring line 18, while any air which tends to flow under the web between the web and the porosity head will be drawn off through the holes 104, 106, and 108 in the outer insert plate 94 and into the sealing line 20 thereby being prevented from entering the measuring line 18. It will be noted that FIGURE 4 further shows apertured mounting lugs 114 and 116 which are welded or otherwise connected to the bottom of the porosity head body 80 in order to permit mounting of the porosity head 10 at a position where it will be in substantially flat contact with a moving web W.

The operation of the method and apparatus of the present invention will now be described in greater detail. It has been found desirable to provide a vacuum at the vacuum tank 16 in the approximate range of 5 to 30 inches of mercury, and preferably in the range of 15 to 25 inches of mercury. By way of example, it has been found that desirable results can be achieved when a vacuum of 20 inches of mercury is provided at the vacuum tank 16. In conditioning the apparatus of FIGURE 1 for operation, having provided the desired constant vacuum at the tank 16, the micrometer needle valves 22 and 24 in the measuring and sealing lines 18 and 20 are adjusted to provide a desired vacuum pressure in the lines 18 and 20 at the locations proximate the porosity head 10 where the manometers 38 and 40 are connected. By observing the vacuum pressure readings on the manometer 38, and on the manometer 40 or the vacuum pressure calibrated bridge amplifier 65, the valves 22 and 24 are adjusted to provide a selected vacuum pressure. It is preferred that approximately equal vacuum pressures should initially be provided in the lines 18 and 20, and the valves 22 and 24 are adjusted accordingly, a suitable vacuum pressure reading at each of the manometers being for example approximately 6 inches of water. Of course, the preferred settings of the valves 22 and 24 may vary somewhat depending upon the type of paper with which the apparatus is to be utilized.

After the desired pressure readings are obtained at the manometers 38 and 40, the porosity head 10 is brought into contact with the continuous web W of paper or the like which may be moving at a relatively high speed, e.g. 1000 to 3000 feet per minute. It will be understood that the porosity head 10 is mounted so that it can be moved upwardly and downwardly into and out of contact with a web W, and it is adjusted so that its upper surface is coplanar with the plane of the moving web of paper W but the particular apparatus for mounting the head does not form a part of the present invention and thus will not be described herein. When the porosity head 10 is moved into contact with the web W, the suction applied to the head will cause the web to be drawn into intimate contact with the top of the head as shown in FIGURE 1. When the paper web W comes into contact with the head 10 so as to lay flat across the center insert plate 90 and outer insert plate 94, the resistance to air flow produced by the presence of the paper will cause the vacuum pressure within the head to be increased. By way of example, assuming that the manometers 38 and 40 each initially read 6 inches of water, such readings might increase to about 17 inches of water after the web is brought into intimate contact with the head.

With the paper web W moving rapidly across the head 10, and the apparatus of FIGURE 1 functioning as described hereinabove, variations in the porosity of the portion of the web which passes over the center insert plate 90 will cause variations in the volume of air which is drawn through the web into the measuring line 18 by the vacuum produced in the vacuum tank 16. Moreover, as the air flow into the measuring line 18 varies due to porosity changes in the web, the vacuum pressure within the measuring line 18 will also vary, and the latter changes in vacuum pressures will be sensed by the pressure transducer 62, such changes being recorded on a continuous chart by the chart recorder 74. It will be noted that a capacitor 118 is connected between the leads 76 and 78 which connect the bridge 65 amplifier to the chart recorder, the purpose being to eliminate undesirable fluctuations in the signals transmitted to the recorder 74. In other words, it has been found that a capacitance, e.g. 240 microfarads, when connected in parallel across the recorder input terminals, will eliminate rapid pen movements and tend to average the input signal.

It is important to understand that in accordance with the method of the present invention a constant vacuum source is provided, such as the previously described vacuum of 20 inches of mercury produced in the vacuum tank 16, and this vacuum source is normally not varied during operation of the porosity measuring apparatus. As stated above, changes in porosity of the web W as it passes over the center insert plate 90 will produce changes in the volume of air which is drawn through the web into the measuring line 18. But no attempt is made to measure such changes in air flow, nor is any attempt made to vary the vacuum source in order to maintain a constant air flow into the line 18. Thus, in accordance with the method of the present invention, air flow into the measuring section 12 is permitted to vary but is not measured, and the porosity of the paper web W is measured by using the pressure transducer 62 to measure changes in vacuum pressure within the vacuum section 12, or as shown in FIGURE 1, in the measuring line 18 which is connected to the vacuum section 12 of the porosity head. Extensive tests have been conducted for the purpose of comparing the porosity measurements obtained by the foregoing method with porosity measurements obtained by conventional Sheffield laboratory tests. These tests have clearly established that the results obtained by the on-the-machine porosity measuring method and apparatus of the present invention correspond very closely with the results obtained by conventional laboratory porosity tests. Specifically, it has been found possible to predict ¾ inch Sheffield laboratory porosity measurements to within ±7 points at 95% confidence.

Figure 2:
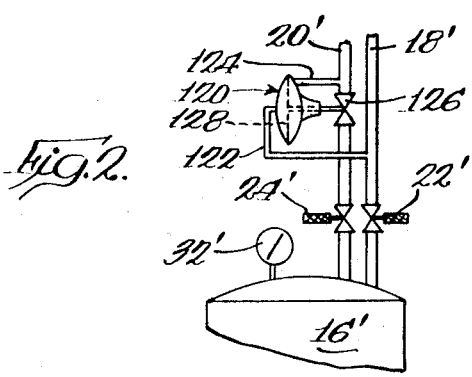
FIGURE 2 is a fragmentary elevational view showing an alternative embodiment of the invention where a differential pressure regulator is connected between a measuring line and a sealing line so as to continuously maintain the vacuum pressure in the sealing line equal to the vacuum pressure in the measuring line.

FIGURE 2 shows an alternative embodiment of the invention wherein a vacuum tank 16' is connected to the measuring and the sealing sections of a porosity head (not shown) by means of a measuring line 18' and a sealing line 20'. In this embodiment of the invention, a differential pressure regulator 120 is connected between the lines 18' and 20' in order to maintain the vacuum pressures in the two lines substantially equal. The regulator 120 is connected by a line 122 to the measuring line 18' and by a line 124 to the sealing line 20'. In addition, the regulator 120 is operatively associated with a valve 126 in the line 20'. By means of a diaphragm or the like 128, opposite sides of which are acted upon by the pressures in the lines 18' and 20', respectively, the valve 126 in the line 20' is controlled continuously so as to maintain the vacuum in the line 20' equal to the vacuum in the line 18'. The purpose of the foregoing arrangement is to insure the effectiveness of the sealing section 14. It has been found, however, that with the method and apparatus of the present invention, it is possible to obtain extremely accurate porosity measurements in many applications without the necessity of using the differential pressure regulator 120.

Figure 5:
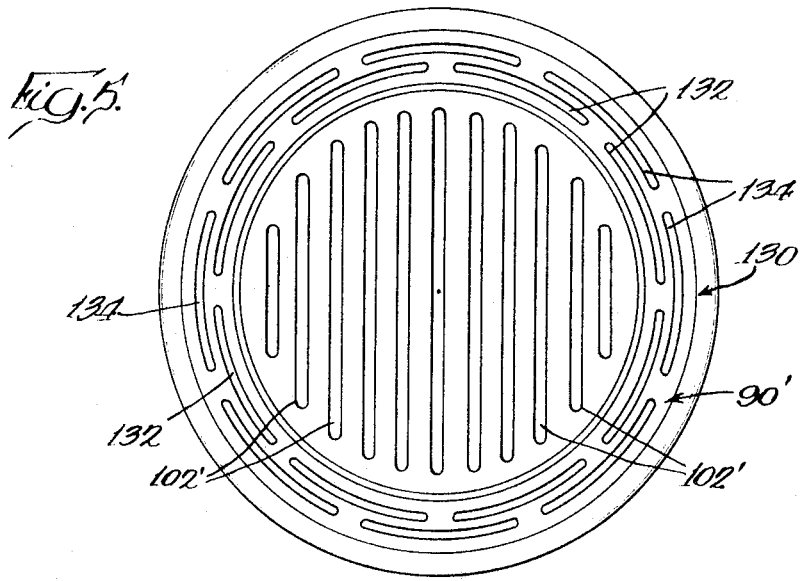
FIGURE 5 is a top plan view showing an alternative form of porosity measuring head in accordance with the present invention.

FIGURE 5 shows an alternative embodiment of the porosity head including a center insert plate 102' which is substantially identical to the plate 102 of FIGURE 3, and an annular outer insert plate 130. The outer insert plate 130 is provided with a plurality of circumferentially spaced arcuate slots arranged in two concentric rings, there being shown a plurality of inner arcuate slots 132 and a plurality of outer arcuate slots 134. The slots 132 and 134 preferably do not exceed approximately ⅛ inch in width, and in the embodiment being described such slots are only about 1/16 inch wide. It will be noted that the inner and outer slots are staggered relative to one another so that it is virtually impossible for any appreciable amount of air to pass over the insert plate 130 without being drawn down into one of the slots by the vacuum provided in the sealing section 14 of the porosity head. In addition, by using relatively long arcuate slots which are quite narrow and are arranged as in FIGURE 5, it has been found that there is little tendency for the paper web to be drawn into the slots as it passes thereover, and thus the design of FIGURE 5 will not impart wrinkles or creases to the web. Moreover, the arrangement of arcuate slots shown in FIGURE 5, like the embodiment of FIGURE 3, tends to minimize collection of dust particles or the like from the paper web W.

One of the advantages of the present invention is that the method utilized permits use of a relatively small porosity head. In other words, the apparatus is quite sensitive and therefore the porosity head need not cover a large area of the web in order to obtain readily measurable variables indicative of porosity. Because of the small size of the porosity head of the present invention, it becomes a relatively simple matter to traverse the head where that is deemed desirable. That is, as the web of paper W moves at high speed in the machine direction, the porosity head 10 may be moved slowly across the web in a direction perpendicular to the machine direction.

By way of example, in accordance with one possible sequence of operations, the porosity head 10 is moved into contact with the web W adjacent one side edge thereof; the head 10 is moved slowly across to a position adjacent the opposite side edge of the moving web and is then returned to a position adjacent the first side edge of the web, while the apparatus associated with the head continuously records porosity readings for the web; the head is then lowered out of engagement with the web and moved somewhat to one side thereof; and the valves 48 and 52 are then opened to provide a blast of air under pressure at the measuring section 12 and sealing section 14 of the head to clear away any dust particles which may have accumulated during the traverse. The same sequence may be repeated automatically or upon actuation of a manual start button or the like as is desired.

Figure 6:
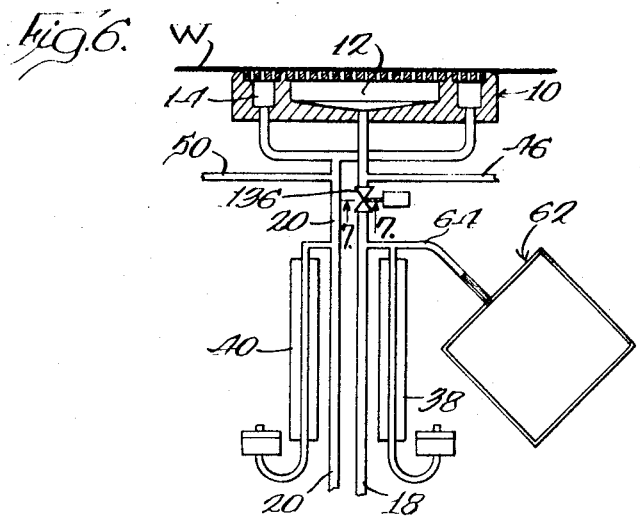
FIGURE 6 is a fragmentary elevational view, partly in section, of a modified form of the apparatus of FIGURE 1, including a standardization valve in the measuring line between a porosity head and a transducer.
Figure 7:
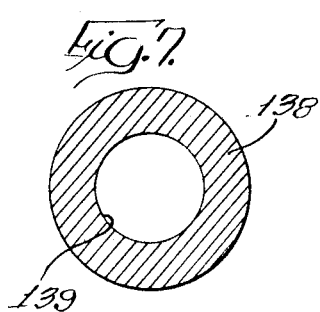
FIGURES 7 and 8 are sectional views taken substantially along the line 7—7 of FIGURE 6 showing the standardization valve in its open and closed positions, respectively.
Figure 8:
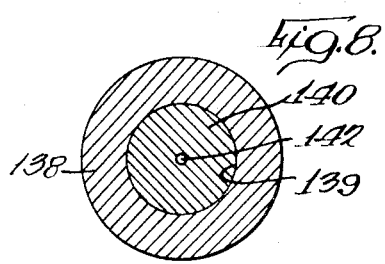

FIGURES 6 to 8 illustrate a modification of the apparatus of FIGURE 1 where a valve 136, referred to herein as a standardization valve, is located in the measuring line 18 between the porosity head 10 and the pressure transducer line 64. FIGURE 7 is a sectional view showing a valve housing 138, the valve 136 being shown in open position so that the diameter of the opening 139 is equal to the inner diameter of the measuring line 18, which may for example be approximately ⅜ inch. FIGURE 8 shows the valve 136 in closed position wherein an orifice plate 140 is disposed in the measuring line 18 so that the only passage therethrough is a small opening 142 provided in the orifice plate 140, the opening 142 being for example approximately 1/32 inch diameter.

The standardization valve 136 may take various forms within the scope of the present invention. For example, the valve housing 138 may include a slot or guideway (not shown) which permits the orifice plate 140 to move radially between the open and closed positions of FIGURES 7 and 8, in which case the orifice plate may be solenoid controlled. If desired, the valve 136 may be a ball valve (not shown) of conventional construction except that a ball rather than the orifice plate 140 may be provided with a single aperture such as the opening 142. The important consideration is that the valve 136 is movable between an open position wherein passage of air through the measuring line 18 is unrestricted, and a closed position wherein air flow through the valve 136 is restricted except for a small opening such as the 1/32 inch diameter orifice 142.

The standardization valve 136 is normally open and is always maintained open during a porosity measuring run. However, in order to standardize the recorder 74 and set the micrometer needle valves 22 and 24 at suitable settings, it is necessary to have a pressure drop in the line 18 sufficient to produce a desired predetermined reading on the manometer 38 or on the vacuum pressure calibrated bridge amplifier 65. Prior to engagement of the web W with the top surface of the porosity head, it may be difficult to standardize the recorder 74 and adjust the valves 22 and 24 at proper settings due to lack of a sufficient pressure drop in the line 18, and therefore at such time the standardization valve 136 is closed and a pressure drop across the orifice plate 140 is produced. The valve 22 is then adjusted to provide a predetermined desired vacuum pressure level at the manometer 38 and at the pressure transducer 62, e.g., 6 inches of water, and after standardizing the recorder 74, the valve 136 is opened preparatory to engagement of the porosity head 10 with the web W for purposes of initiating a porosity measuring run. The orifice plate 140 provides a standard pressure drop to afford uniformity each time the apparatus is standardized or calibrated.

While we have described our invention in certain preferred forms, we do not intend to be limited to such forms, except insofar as the appended claims are so limited, since modifications coming within the scope of our invention will readily occur to those skilled in the art, particularly with our disclosure before them.

We claim:

1. Apparatus for continuously measuring the air permeability of a rapidly moving web of paper comprising, in combination, a measuring head having apertured plate means for engagement with a moving web, a constant vacuum source connected to said measuring head for drawing air through said web and into said measuring head whereby the amount of air drawn into said measuring head and the consequent vacuum pressure within said measuring head will vary in accordance with the air permeability of said web, and pressure transducer means for continuously measuring changes in vacuum pressure proximate said head as a continuous indication of the air permeability of said web.

2. The invention of claim 1 wherein said vacuum source is connected to said measuring head by an air conduit and said pressure transducer means is connected to said air conduit proximate said measuring head.

3. The invention of claim 1 wherein a bridge amplifier is connected to said pressure transducer means and the signals from said amplifier are fed to a chart recorder for continuously recording said changes in vacuum pressure as a continuous indication of the air permeability of said web.

4. The invention of claim 1 where the magnitude of said constant vacuum source is in the approximate range of 5 to 30 inches of mercury.

5. The invention of claim 1 where said measuring head comprises an inner measuring section and an outer sealing section surrounding said measuring section and where said constant vacuum source comprises a common source of vacuum which is connected to both said measuring section and said sealing section.

6. The invention of claim 5 where a measuring line connects said vacuum source to said measuring section and a sealing line connects said vacuum source to said sealing section, a first manometer connected to said measuring line proximate said head, and a second manometer connected to said sealing line proximate said head, said first manometer and said pressure transducer means being connected to said measuring line at a common connection whereby said first manometer will provide a direct reading of the vacuum pressures being sensed by said pressure transducer means.

7. Apparatus for continuously measuring the air permeability of a rapidly moving web of paper comprising, in combination, a measuring head for engagement with a moving web, a constant vacuum source connected to said measuring head for drawing air through said web and into said measuring head whereby the amount of air drawn into said measuring head and the consequent vacuum pressure within said measuring head will vary in accordance with the air permeability of said web, and means for continuously measuring changes in vacuum pressure proximate said head as a continuous indication of the air permeability of said web, said measuring head being provided at a web-engaging surface thereof with a plurality of narrow spaced apart slots arranged parallel to one another and parallel to the direction of movement of said web.

8. The invention of claim 7 where said parallel slots do not exceed approximately ⅛ inch in width.

9. The invention of claim 7 where said measuring head has an outer diameter which does not exceed approximately 7 inches and where there are provided at least approximately seven of said parallel slots each of which does not exceed approximately ⅛ inch in width.

10. The invention of claim 7 where said measuring head comprises a central measuring section and an annular sealing section, said measuring section including circular web-engaging measuring plate means having said parallel slots formed therein, and said sealing section including annular web-engaging sealing plate means which completely surrounds said measuring plate means.

11. The invention of claim 10 where said annular sealing plate means is provided with a plurality of small round apertures arranged in a plurality of substantially concentric rings.

12. The invention of claim 10 where said annular sealing plate means is provided with a plurality of narrow arcuate slots arranged in a plurality of substantially concentric rings, the slots in one ring being staggered relative to the slots in another ring.

13. The invention of claim 1 wherein said vacuum source is connected to said measuring head by an air conduit, said pressure transducer means is connected to said air conduit to measure changes in vacuum pressures therein, and wherein standardization valve means is provided in said air conduit between said measuring head and said pressure transducer means, said valve means being movable between an open position wherein passage or air through said conduit means is substantially unrestricted and a closed position wherein passage of air through said conduit means is substantially but not completely restricted.

14. The invention of claim 5 where a measuring line connects said vacuum source to said measuring section and a sealing line connects said vacuum source to said sealing section, a valve in said sealing line, and differential pressure regulator means responsive to the respective vacuum pressures in said measuring line and said sealing line and connected with said valve for regulating the latter so as to continuously maintain the vacuum pressures in said measuring and sealing lines substantially equal.

15. The invention of claim 7 where said measuring head comprises a central measuring section and an annular sealing section which completely surrounds said measuring section, said measuring section being separated from said sealing section by continuous wall means, said measuring section including web-engaging measuring plate means having said parallel slots formed therein, said measuring plate means being removably mounted in said measuring head inside of said continuous wall means, and said sealing section including web-engaging sealing plate means having air openings formed therein, said sealing plate being removably mounted in said measuring head outside of said continuous wall means.

16. Apparatus for continuously measuring the air permeability of a rapidly moving web of paper comprising, in combination, a measuring head having a web-engaging surface with a plurality of narrow spaced apart slots formed therein and arranged parallel to one another and parallel to the direction of movement of said web, a constant vacuum source connected to said measuring head for drawing air through said web and into said measuring head whereby the amount of air drawn into said measuring head and the consequent vacuum pressure within said measuring head will vary in accordance with the air permeability of said web, pressure transducer means for continuously measuring changes in vacuum pressure proximate said head, and bridge amplifier means connected to said pressure transducer means for feeding signals from said pressure transducer means to a chart recorder for continuously recording said changes in vacuum pressure as a continuous indication of the air permeability of said web.

17. The invention of claim 16 wherein said measuring head comprises an inner measuring section and an outer sealing section completely surrounding said measuring section and where said constant vacuum source comprises a common source of vacuum connected to both said measuring section and said sealing section, said measuring section being separated from said sealing section by continuous wall means and including web-engaging measuring plate means having said parallel slots formed therein, said measuring plate means being removably mounted in said measuring head inside of said continuous wall means, and said sealing section including web-engaging sealing plate means having air openings formed therein, said sealing plate means being removably mounted in said measuring head outside of said continuous wall means.

18. The invention of claim 17 where the magnitude of said constant vacuum source is in the proximate range of 5 to 30 inches of mercury, said measuring head has an outer diameter which does not exceed approximately 7 inches, and wherein there are provided at least approximately seven of said parallel slots each of which does not exceed approximately ⅛ inch in width.

19. A method of continuously measuring the air permeability of a rapidly moving web of paper comprising the steps of engaging a measuring head member in intimate contact with a moving web, connecting a constant vacuum source to the measuring head member so as to draw air through the web and into said measuring head member in such a manner that changes in the air permeability of said web will produce changes in the volume of air flowing into said head and consequent changes in the vacuum pressure proximate said measuring head member, and continuously measuring said vacuum pressure changes as an indication of the air permeability of said web.

20. The method of claim 19 where a constant vacuum in the approximate range of 5 to 30 inches of mercury is maintained at said vacuum source.

References Cited
UNITED STATES PATENTS

| | | | |
|---|---|---|---|
| 3,266,295 | 8/1966 | Williamson | 73—38 |
| 3,301,043 | 1/1967 | Lyssy | 73—38 |
| 3,371,518 | 3/1968 | Keyes | 73—38 |

LOUIS R. PRINCE, Primary Examiner

WILLIAM A. HENRY II, Assistant Examiner